3,209,034
OXIDATION OF OLEFINES
Tokutaro Narita, Osaka, Yasushi Nishijima, Sakai, and Noriji Zushi and Toru Hosoya, Osaka, Japan, assignors to Kanegafuchi Spinning Co., Ltd., Tokyo, Japan
No Drawing. Filed Nov. 27, 1962, Ser. No. 240,447
Claims priority, application Japan, Dec. 8, 1961, 36/44,661; Aug. 6, 1962, 37/33,864
5 Claims. (Cl. 260—604)

This invention relates to the oxidation of olefinic hydrocarbons containing at least three carbon atoms to produce corresponding unsaturated aldehydes. More particularly, this invention relates to the catalytic oxidation of propylene or isobutylene in a gaseous phase by contacting a gaseous mixture of the olefine and oxygen or an oxygen-containing gas with an improved catalyst to produce acrolein or methacrolein respectively. This invention also relates to an improved catalyst to be used in such oxidation of olefines and also to the preparation of the catalyst.

There have been proposed a number of methods for producing unsaturated aldehydes by the partial or controlled oxidation of the corresponding olefinic hydrocarbons with oxygen or oxygen-containing gas in the presence of catalysts. The performance of the method of this type largely depends upon the catalytic activity (as to both reactivity and selectivity) and its life. Various types of catalyst for this oxidation have been proposed heretofore, but there has been developed no catalyst which is fully satisfactory in respect to operatability at a relatively low temperature, long life of catalytic activity, maintenance of substantially constant catalytic activity, ability of converting olefinic hydrocarbons to the desired unsaturated aldehydes with high yields.

It is an object of the present invention to provide a novel method for the partial or controlled oxidation of olefinic hydrocarbons containing at least three carbon atoms to produce corresponding unsaturated aldehydes with an excellent yield.

It is another object of the present invention to provide a novel catalyst for the above mentioned novel method, the activity of the said catalyst being maintained substantially constant for a long period of time.

Other objects, features and advantages of the present invention will be apparent from the following detailed description.

According to the present invention a gaseous mixture of an olefinic compound having at least three carbon atoms and oxygen or an oxygen-containing gas is contacted at an elevated temperature with a novel catalyst comprising at least one alkali metal oxide, at least one alkali metal halide and a copper catalyst system $$(CuO = Cu_2O = Cu)$$

In carrying out the method of this invention any olefinic hydrocarbon containing at least three carbon atoms may be used, although propylene and isobutylene are preferred because they are converted, according to this invention, respectively to acrolein and methacrolein which are industrially valuable as starting or intermediate materials for producing various useful products.

The oxidizing agent used in this invention is oxygen. The oxygen may be used as such in relatively pure state or in the form of an oxygen-containing gas, for example air.

The ratio of oxygen to the olefinic hydrocarbon may vary considerably over a wide range. In general, the olefinic hydrocarbon is used in molar excess over the oxygen. It is advantageous that a molar (or volumetric) ratio of oxygen to olefine is 1 to 1–20, preferably 1 to 2–9. If desired an inert gas such as nitrogen, or steam may also be added as a diluent to the gaseous mixture of oxygen (or air) and olefine. The inert gas may be added in an amount up to 50% (by volume) based on the volume of gas to be charged into the reaction system.

The gaseous mixture is contacted with the catalyst of this invention. The important feature of the invention is in the use of the novel catalyst. The catalyst of this invention comprises (1) a copper catalyst system of $CuO—Cu_2O—Cu$, (2) at least one compound selected from alkali metal oxides and (3) at least one compound selected from alkali metal halides. Examples of alkali metal oxides are sodium oxide, potassium oxide and lithium oxide. Examples of alkali metal halides are sodium chloride, sodium fluoride, sodium iodide, potassium chloride, potassium fluoride, potassium iodide, lithium chloride, lithium fluoride, lithium iodide, etc. Each of the alkali metal oxide and alkali metal halide is used in an amount of 0.02 to 0.05 mole, preferably 0.03–0.04 mole (calculated as alkali metal) per mole of the copper component (calculated as metallic copper).

These catalyst components are preferably supported on or mixed with a suitable carrier material such as silica-alumina (e.g., mullite porcelain), pumice, etc. The carrier may be in the form of powder, granule, etc. When a silica-alumina type carrier is employed the ratio of silica to alumina may vary over a wide range, for example from 3:7 to 7:3 by weight. The amount of the catalyst components on the carrier may also vary over a wide range. Generally the copper content of the total catalyst including support or carrier may range, for example, from about 1 to about 20% by weight calculated as metallic copper.

The catalyst of this invention may be prepared in various manners. The following three procedures are preferable.

The first procedure comprises immersing a carrier in an aqueous solution containing a copper salt such as copper nitrate, copper sulfate, copper chloride, copper acetate, etc., which is water soluble and is capable of forming copper oxide upon thermal decomposition, an alkali metal salt such as sodium nitrate, lithium nitrate, etc. which is soluble in water and is capable of forming an alkali metal oxide upon thermal decomposition and a water soluble alkali metal halide such as sodium chloride, lithium chloride, sodium fluoride, lithium iodide, etc. The mixture is stirred and is evaporated to dryness while heating and stirring, so that all the solid content in the solution is substantially deposited on the carrier. The dried solid residue is sintered in air at 400° C.–1000° C. until the copper salt and alkali metal salt are converted into cupric oxide and alkali metal oxide respectively. Thus a catalyst comprising cupric oxide, alkali metal oxide and alkali metal halide supported on a carrier is obtained. The proportions of the three salts to be dissolved in the aqueous solution are so selected that the resulting catalyst would contain the catalytic components in a desired ratio.

The second procedure for preparing the catalyst comprises immersing a carrier in an aqueous solution containing a water soluble salt (e.g., copper nitrate, copper sulfate, copper acetate, etc.) which is capable of precipitating upon reaction with an alkaline substance (e.g., NH₄OH) which can be gasified upon thermal decomposition, a water soluble alkali metal salt (e.g., sodium nitrate, lithium nitrate, etc.) which is capable of forming alkali metal oxide upon thermal decomposition and a water soluble alkali metal halide (e.g., lithium chloride, sodium cloride, lithium iodide, sodium fluoride, etc.) The mixture is stirred and evaporated to dryness while heating and stirring. Then an alkaline solution (e.g., concentrated aqueous ammonia) is added to the dried solid residue while stirring so that the copper salt on the carrier is converted to water insoluble hydroxide. Then the mass is heated to dryness and further sintered in an air at a temperature of from 400° C. to 1000° C. until the copper hydroxide and alkali metal salt are converted into cupric oxide and alkali metal oxide. Thus a catalyst comprising cupric oxide, alkali metal oxide and alkali metal halide supported on the carrier is obtained.

The third procedure for preparing the catalyst of this invention comprises immersing a carrier material in an aqueous solution containing a water soluble alkali metal salt (e.g., sodium nitrate, lithium nitrate, etc.) which is capable of forming an alkali metal oxide upon thermal decomposition and a water soluble alkali metal halide (e.g., lithium chloride, sodium chloride, sodium fluoride, lithium iodide, etc.). The mixture is evaporated to dryness while stirring. The dried solid residue is sintered in air at a temperature of from 400° C. to 1000° C. until the alkali metal salt is converted into the corresponding alkali metal oxide. Then the mass is mixed with copper powders or particles and the mixture is agitated until a desired amount of copper is adhered on the carrier. The mass is then sintered in air at a temperature of from 400° C. to 1000° C. until the copper is converted into copper oxide. Thus a catalyst comprising copper oxide, alkali metal oxide and alklai metal halide supported on the carrier is obtained.

In any case the catalyst as prepared above is then subjected to a reduction treatment until the copper component in the catalyst becomes a composite form comprising CuO, Cu₂O and Cu.

In carrying out the method of this invention employing the novel catalyst mentioned above, the gaseous mixture of an olefinic hydrocarbon and oxygen or an oxygen-containing gas and, is desired, an inert gas (e.g., nitrogen, steam, etc.) is introduced into a reactor wherein the gas is contacted with the catalyst. The reactor may be of any suitable form or a conventional one. Generally, an elongated tubular or cylindrical reactor is employed so that the gas is continuously charged into the reactor from one end and continuously discharged from the other end so that the reaction is carried out continuously. During the passage through the reactor the gaseous mixture is contacted with the catalyst in the reactor so that the olefinic hydrocarbon is subjected to a partial or controllled oxidation to produce the corresponding unsaturated aldehyde. The catalyst in the reactor may be in form of a fixed bed or in a fluidized form.

The oxidation reaction is carried out at an elevated temperature. The temperature may vary depending upon the composition of the gaseous mixture to be charged into the reactor. Generally the temperature is within the range of from about 250° C. to about 400° C., preferably from 270° C. to 340° C. The time of contact (calculated as N.T.P. vacant contact time) between the gas and the catalyst is between 0.3 and 2 seconds. The reactor may be maintained at a desired temperature within the range mentioned above in any suitable manner such as by providing the reactor with an externally heating apparatus or by immersing the reactor in a suitable heating medium such as salt bath.

The pressure within the reactor or under which the oxidation reaction is carried out may be atmospheric pressures or above (e.g., up to about 3 atmospheres higher than atmospheric pressures).

The unsaturated aldehyde product may be isolated from the gas leaving the reactor by conventional means well known in the art, such as by cooling, scrubbing, distillation, extraction, etc.

It has been found that when the catalyst as prepared in the manner mentioned before and in which the copper component is in the form of cupric oxide is used as such in the process of this invention, the cupric oxide (CuO) is partially converted to cuprous oxide (Cu₂O) and further to metallic copper (Cu) very slowly as the reaction proceeds. The conversion is continued until attaining an equilibrium among CuO, Cu₂O and Cu. The point of equilibrium of these three copper components or proprotions of these three copper components at the equilibrium state vary depending upon the particular gas composition, reaction temperature, time of contact, etc. Therefore, until attaining the equilibrium the catalytic activity is unstable and varied so that no substantially constant reaction condition is obtained. The time before attaining the equilibrium is long and there is caused inconvenience.

It has been found that this drawback can be overcome by reducing the catalyst to the equilibrium prior to commencing the oxidation reaction. This preliminary reduction can be easily effected by any suitable manner, preferably exposing the catalyst to a stream of the gas of an olefinic hydrocarbon substantially free from an oxidizing gas at an elevated temperature. It is preferable in this case to employ the olefinic hydrocarbon same as that to be oxidized in the subsequent main reaction. The temperature at which this preliminary reduction is carried out is not critical, but in order to reduce the time it preferabe to employ a temperature higher by 5–50° C. that the temperature at which the subsequent main reaction (oxidation) is carried out. The exposure to a stream of the olefinic hydrocarbon gas is continued until the catalyst attains the equilibrium where the proportions of CuO, Cu₂O and Cu are generally 0.1–0.4 (CuO):1 (Cu₂O): 0–0.2 (Cu) in molar ratio.

This preliminary reduction of the catalyst is conventiently carried out in a reactor for the oxidation reaction.

The reasons why the combination of the copper type catalyst with an alkali metal oxide and an alkali metal halide brings about improvements in activity, selectively and life of the catalyst system are not exactly known. However, our assumption is as follows:

A copper-cuprous oxide-cuprous oxide catalyst system is insufficient in giving a high yield of the desired oxidized product. When an alkali metal oxide is added to this copper type catalyst, the by-production of undesired products other than the desired product (corresponding unsaturated aldehyde), particularly the production of carbon dioxide gas due to the combustion of the compounds invalued, is depressed to that the selective formation of the objective unsaturated aldehyde is increased. Futhermore, it is apparent that the addition of the alkali metal oxide would prolong the effective life of the catalyst. When an alkali metal halide is added to the copper oxide type catalyst the catalytic activity is increased, whereas the effective life of the catalyst is decreased. However, this drawback of reduction in the catalytic life is fully overcome by the addition of the alkali metal oxide. Thus, according to the invention the copper oxide component, alkali metal oxide component and alkali metal halide component cooperate with each other to fill up the respective drawbacks.

This effect of cooperation can be seen in the following experiments and results thereof. A gaseous mixture (50:50 in volume ratio) of isobutylene and air was passed through a tubular reactor at 320° C. under atmospheric pressure. In the reactor there was placed a fixed bed of a catalyst and the gas was contacted to the catalyst for one second during the passage through the reactor. The gaseous product leaving the reactor was analyzed. The same procedure was repeated with various catalysts listed in the following table, which shows the results of these experiments.

| Catalyst | Result | After— | | | | |
|---|---|---|---|---|---|---|
| | | 0.5 hr. | 2 hrs. | 5 hrs. | 10 hrs. | 100 hrs. |
| Cu$_2$O | A | 23.5 | 22.8 | 15.6 | | |
| | B | 2.2 | 2.1 | 1.5 | | |
| | C | 79.2 | 79.4 | 80.9 | | |
| Cu$_2$O+Na$_2$O | A | 43.0 | 43.5 | | 43.2 | 43.7 |
| | B | 4.7 | 4.9 | | 4.9 | 4.8 |
| | C | 84.3 | 85.0 | | 85.0 | 84.5 |
| Cu$_2$O+NaCl | A | 69.0 | 66.8 | 59.1 | 48.3 | |
| | B | 6.1 | 5.9 | 5.4 | 4.6 | |
| | C | 77.3 | 77.2 | 78.5 | 79.8 | |
| Cu$_2$O+NaCl+Na$_2$O | A | 66.0 | | | 67.4 | 66.5 |
| | B | 6.8 | | | 6.5 | 6.6 |
| | C | 81.2 | | | 80.3 | 80.9 |

A: Conversion of oxygen, volumeric percent.
B: Conversion of isobutylene, volumeric percent.
C: Selectivity of methacrolein (based on isobutylene), percent.

To more fully illustrate this invention, the following examples are presented. It is to be understood, however, that these examples are presented merely as illustration only and are not intended to limit the scope of the invention. Throughout the examples the selectivity of acrolein or methacrolein is based on the particular olefine employed, and the contact time is the value N.T.P. (normal temperature, pressure) vacant.

*Example 1*

To 100 cc. of water were dissolved 0.83 mole of copper sulfate, 0.0028 mole of sodium nitrate and 0.0028 mole of sodium chloride, and added 100 cc. of mullite porcelain particles (15–20 mesh). The mixture was stirred and evaporated to dryness. The dried residue was sintered in air at 400° C. for 1 hour. Five cc. of the catalyst thus prepared was filled in a U-shaped tube (10 mm. in diameter) of Terex glass. The U-tube was immersed in a salt bath maintained at 330° C. and isobutylene gas was passed through the tube at a rate of 50 cc. per minute for 1 hour to reduce the catalyst.

After this pretreatment (reduction) of the catalyst, the salt bath temperature was lowered to 320° C. and a mixed gas of isobutylene and air was passed in contact with the fixed layer or bed of the catalyst in the tube to effect the oxidation of isobutylene to produce methacrolein under the following conditions:

Feed gas composition (volume percent):
Isobutylene _____ 55
Air _____ 45
Reaction temperature (salt bath temperature) _° C__ 320
Pressure _____ Atmospheric
Average contact time with catalyst _____sec__ 1

The gases leaving the reaction tube were analyzed. The results were as follows:

| | After— | |
|---|---|---|
| | 0.5 hour | 10 hours |
| Conversion of O$_2$ (vol. percent) | 66 | 67 |
| Space time yield of methacrolein (mol./l./hr.) | 4.5 | 4.5 |
| Selectivity of methacrolein_____percent__ | 81 | 80 |
| Concentration of methacrolein in the resulting gas_____percent__ | 2.8 | 2.8 |
| Conversion of isobutylene (vol. percent) | 6.29 | 6.30 |

It will be apparent from the above table that the activity of the catalyst as well as the excellent selectivity of methacrolein remain substantially unchanged even after 10 hours' continuous reaction.

*Example 2*

To 300 cc. of water were dissolved 0.25 mole of copper nitrate, 0.01 mole of sodium nitrate and 0.01 mole of sodium chloride, and added 300 cc. of mullite porcelain particles (6–8 mesh). The mixture was stirred and evaporated to dryness. The dried residue was sintered in air at 500° C. for 1 hour. A stainless tube (25 mm. diameter) was filled with 244 cc. of the catalyst as prepared above and isobutylene gas was passed through the tube at a rate of 50 l./hr. while maintaining the tube temperature at 350° C. to carry out the reduction of the catalyst.

After this pretreatment (reduction of the catalyst) the temperature of the tube was lowered to 320° C., and a mixed gas of isobutylene (92.8 vol. percent) and oxygen (7.2 vol. percent) was passed the tube in contact with the fixed bed of the catalyst therein at a gauge pressure of 0.5 kg./cm.$^2$ and with a contact time of 1.2 seconds. The gases leaving the reaction tube were analyzed and the following results were obtained.

| | After— | |
|---|---|---|
| | 0.5 hour | 100 hours |
| Conversion of oxygen (vol. percent) | 71 | 71.5 |
| Conversion of isobutylene (volume percent) | 3.3 | 3.4 |
| Space time yield of methacrolein (mol./l./hr.) | 2.2 | 2.3 |
| Selectivity of methacrolein_____percent__ | 83 | 84 |
| Concentration of methacrolein in the resulting gas_____percent__ | 2.5 | 2.7 |

*Example 3*

A catalyst was prepared in the same manner as described in Example 1. The catalyst (5 cc.) was filled in a U-shaped tube (10 mm. in diameter) of Terex glass which was then immersed in a salt bath of 350° C. To this tube was passed propylene gas for 1 hour at a rate of 50 cc./min. to reduce the catalyst.

After this pretreatment (reduction of the catalyst) the temperature of the salt bath was lowered to 320° C., and a mixed gas of propylene (40 vol. percent), air (40 vol. percent) and steam (20 vol. percent) was passed to the tube in contact with the fixed bed of the catalyst under atmospheric pressure and with a contact time of 1 second. The gases leaving the reaction tube were analyzed and the following results were obtained:

| | After— | |
|---|---|---|
| | 0.5 hour | 8 hours |
| Conversion of oxygen (vol. percent) | 60 | 60 |
| Conversion of propylene (vol. percent) | 7.7 | 7.6 |
| Space time yield of acrolein (mol./l./hr.) | 4.0 | 3.9 |
| Selectivity of acrolein_____percent__ | 82 | 81 |
| Concentration of acrolein in the resulting gas_____percent__ | 2.5 | 2.4 |

*Example 4*

To 100 cc. of water were dissolved 0.083 mole of copper nitrate, 0.0028 mole of sodium nitrate and 0.0028 mole of sodium fluoride, and added 100 cc. of mullite porcelain particles (80–100 mesh). The mixture was stirred and evaporated to dryness. The dried solid residue was sintered in air for 1 hour at 400° C. A U-shaped Terex glass tube (12.9 mm. in diameter) was charged with 7.6 cc. of the catalyst as prepared above and the tube was immersed in a salt bath maintained at 350° C. Then gaseous isobutylene was passed to the tube at a space rate of 3,600 cc./cc./hr. for 1 hour in such a manner that the gas flows from the bottom of and through upwardly the catalyst layer so that the catalyst is fluidized thereby and reduced.

After this pretreatment (reduction of the catalyst), the temperature of the salt bath was lowered to 320° C., and a mixed gas of isobutylene (50 vol. percent) and air (50 vol. percent) was passed to the tube in contact with the fluidized bed of the catalyst under a pressure of 793 mm. Hg and with a contact time of 1 second. The gases leaving the reaction tube were analyzed and the following results were obtained:

| | After— | | |
|---|---|---|---|
| | 0.5 hour | 3 hours | 10 hours |
| Conversion of oxygen (vol. percent) | 75 | 74 | 74 |
| Conversion of isobutylene (vol. percent) | 9.2 | 9.05 | 9.05 |
| Space time yield of methacrolein (mol/l./hr.) | 6.0 | 5.9 | 5.9 |
| Selectivity of methacrolein_____percent__ | 82.0 | 82.0 | 82.0 |
| Concentration of methacrolein in the resulting gas_____percent__ | 3.74 | 3.67 | 3.67 |

*Example 5*

To 100 cc. of water were dissolved 0.083 mole of copper nitrate, 0.0028 mole of sodium nitrate and 0.0028 mole of sodium fluoride, and added 100 cc. of pumice-stone particles prepared by washing a pumice-stone mass with acid and then crushing the same into 15–20 mesh size. The mixture was stirred and evaporated to dryness. The solid residue was sintered in air for 1 hour at 500° C. A U-shaped Terex glass tube (10 mm. in diameter) was filled with 5 cc. of the catalyst as prepared above and the tube was immersed in a salt bath maintained at 350° C. To this tube was passed isobutylene gas at a rate of 50 cc./min. to reduce the catalyst.

After this pretreatment (reduction of the catalyst), the temperature of the salt bath was lowered to 330° C., and a mixed gas of isobutylene (44.3 vol. percent), oxygen (10.3 vol. percent) and steam (45.4 vol. percent) was passed to the tube in contact with the fixed layer or bed of the catalyst under atmospheric pressure and with a contact time of 1.07 second. The gases leaving the reaction tube were analyzed and the following results were obtained:

After one hour
Conversion of oxygen (vol. percent) _____ 56.0
Conversion of isobutylene (vol. percent) _____ 7.8
Space time yield of methacrolein (mol/l./hr.) ____ 4.4
Selectivity of methacrolein _____percent__ 84
Concentration of methacrolein in the resulting gas _____do____ 2.9

*Example 6*

To 100 cc. of water were dissolved 0.05 mole of copper nitrate, 0.002 mole of sodium nitrate and 0.002 mole of sodium chloride, and added 100 cc. of mullite carrier in the form of particles (32–60 mesh). The mixture was evaporated to dryness. While stirring, 30 cc. of 30% $NH_4OH$ solution was dropwise added to the dried residue and then the mixture was heated to 400° C. while stirring. Then the mixture was sintered in air for 1 hour at 400° C. while stirring. A U-shaped hard glass tube (10 mm. in diameter) was charged with 4 cc. of the catalyst as prepared above and the tube was immersed in a salt bath maintained at 350° C. Then gaseous isobutylene was passed through the tube at a flow rate of 50 cc./min. to effect the reduction of the catalyst.

After this pretreatment (reduction of the catalyst), the salt bath temperature was lowered to 315° C., and mixed gas of isobutylene (50 vol. percent), oxygen (13 vol. percent) and steam (37 vol. percent) was introduced to the tube in contact with the fluidized bed or layer of the catalyst at a pressure of 780 mm. Hg and with a contact time of 1 second. The gases leaving the reaction tube were analyzed and the following results were obtained:

After one hour
Conversion of oxygen (vol. percent) _____ 71
Conversion of isobutylene (vol. percent) _____ 9.8
Space time yield of methacrolein (mol/l./hr.) ____ 6.43
Selectivity of methacrolein _____percent__ 82.2
Concentration of methacrolein in the resulting gas _____do____ 4.0

*Example 7*

To 200 cc. of water were dissolved 0.001 mole of lithium nitrate and 0.001 mole of lithium chloride, and added 300 cc. of silica-alumina particles (15–20 mesh). The mixture was stirred and evaporated to dryness. The dried solid residue was sintered in air for 1 hour at 500° C. The sintered particles were mixed with copper particles of 30–80 mesh and the mixture was violently agitated in a porcelain vessel for 4 hours. By this treatment 0.2 mole of copper was deposited on the carrier. The mass was then sintered in air for one hour at 500° C. The catalyst thus prepared was charged in a stainless tube (25 mm. in diameter) and isobutylene gas was passed through the tube at a rate of 50 l./hr. for one hour while maintaining the tube temperature at 400° C.

After this treatment (reduction of the catalyst), the temperature of the steel tube was lowered to 340° C. and a mixed gas of isobutylene (30 vol. percent), air (50 vol. percent) and steam (20 vol. percent) was introduced into the tube in contact with the fluidized bed or layer of the catalyst, at a pressure of 780 mm. Hg and with a contact time of 1 second. The gases leaving the reaction tube were analyzed and the following results were obtained:

After 3 hours
Conversion of oxygen (vol. percent) _____ 64
Conversion of isobutylene (vol. percent) _____ 11.6
Space time yield of methacrolein (mol/l./hr.) ____ 3.9
Selectivity of methacrolein _____percent__ 80
Concentration of methacrolein in the resulting gas _____do____ 2.4

*Example 8*

The preparation and reduction of catalyst were carried out in the same manner as in Example 6 except that the mesh size of the carrier was 24–32 mesh.

The reaction tube temperature was maintained at 350° C. and a mixed gas of propylene (54.5 vol. percent), oxygen (12.95 vol. percent), steam (2.95 vol. percent) and nitrogen (29.6 vol. percent) was introduced into the tube in contact with the fixed bed or layer of the catalyst at a pressure of 790 mm. Hg and with a contact time of 1.03 second. The gases leaving the reaction tube were analyzed and the following results were obtained:

After 3 hours
Conversion of oxygen (vol. percent) _____ 42.6
Conversion of propylene (vol. percent) _____ 6.41
Space time yield of acrolein (mol/l./hr.) _____ 4.42
Selectivity of acrolein _____percent__ 81.0
Concentration of acrolein in the resulting gas _____do____ 2.85

What we claim is:

1. A process of oxidizing an olefinic hydrocarbon selected from the group consisting of propylene and isobutylene to convert the same into the corresponding unsaturated aldehyde which comprises contacting a gaseous mixture of oxygen and the olefinic hydrocarbon in a molar ratio of oxygen to olefine hydrocarbon of from 1:1 to 1:20 with a catalyst comprising (1) a copper catalyst system comprising Cu, $Cu_2O$ and CuO in a molar ratio of 0 to 0.2 Cu:1 $Cu_2O$:0.1 to 0.4 CuO, (2) at least one alkali metal oxide and (3) at least one alkali metal halide, at a temperature within the range from 250° C. to 400° C., said catalyst containing 0.02 to 0.05 mole (calculated as alkali metal) of each of the alkali metal halide and alkali metal oxide per mole of the copper component calculated as metallic copper.

2. A process as claimed in claim 1 wherein the molar ratio of the oxygen to olefinic hydrocarbon is 1:2 to 1:9.

3. A process as claimed in claim 1 wherein the reaction temperature is 270° C. to 340° C.

4. A process as claimed in claim 1 wherein the gaseous mixture is contacted with the catalyst for 0.3 to 2 seconds.

5. A process as claimed in claim 1 wherein the catalyst comprises 0.03 to 0.04 mole (calculated as alkali metal) of each of the alkali metal halide and alkali metal oxide per mole of the copper component calculated as metallic copper.

References Cited by the Examiner

UNITED STATES PATENTS 2,451,485  10/48  Hearne et al. _____ 260—604

FOREIGN PATENTS 825,602  12/59  Great Britain.
938,833  10/63  Great Britain.

OTHER REFERENCES

Popova et al., Akad. Nauk, S.S.S.R. Dok., vol. 124, pp. 842–845, 1959.

LEON ZITVER, *Primary Examiner.*